Figure 2:
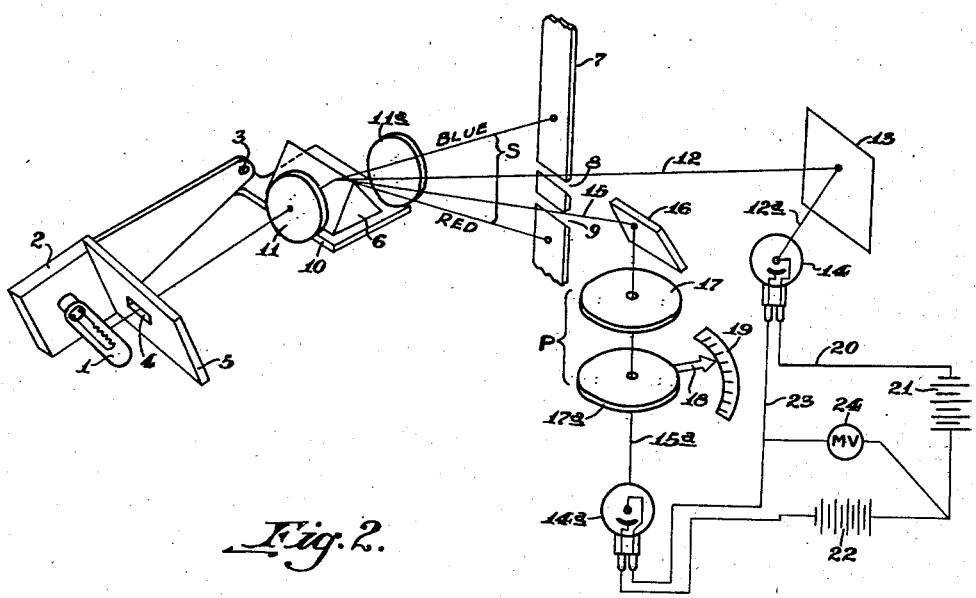

Sept. 24, 1946.  A. P. KRUPER  2,408,023
SPECTROPHOTOMETRIC SYSTEM
Filed May 1, 1943  2 Sheets-Sheet 1

INVENTOR.
ANDREW P. KRUPER.
BY Brown, Critchlow & Flick
his ATTORNEYS.

WITNESSES.
E. J. Maloney
Fulton B. Bliss

Patented Sept. 24, 1946

2,408,023

UNITED STATES PATENT OFFICE 2,408,023

SPECTROPHOTOMETRIC SYSTEM

Andrew P. Kruper, Waterbury, Conn., assignor to Fisher Scientific Company, Pittsburgh, Pa., a corporation of Pennsylvania Application May 1, 1943, Serial No. 485,392

13 Claims. (Cl. 88—14)

This invention relates to the determination of the spectral characteristics of materials. It is adapted particularly to spectrophotometry or colorimetry, for which reason it will be described with particular reference thereto.

In spectrophotometry a common practice is to disperse polychromatic light to form the visible spectrum and by means of a slit to isolate and form a narrow band of wave lengths. The band is then split into two beams by appropriate means. One of the resultant beams, which may be termed the sample beam, is passed to or through the material whose properties are to be determined and the reflected or transmitted, as the case may be, beam passes then to a light-sensitive device which under the influence of light, generates or varies a flow of current. A photoelectric cell, sometimes termed a phototube or photocell, is commonly used for this purpose. The other beam, which may be termed the comparison beam, is passed to a second photocell or other light-sensitive device which is connected in an electric circuit that includes the sample photocell and a means, such as a millivoltmeter or galvanometer, for determining the effect upon the circuit of the light beams which fall upon the photocells.

The procedure in making a measurement is to place first in the path of the sample beam a reference standard, such as magnesia (MgO) or magnesium carbonate ($MgCO_3$), and to adjust the intensity of the comparison beam by some suitable means until the outputs of the two photocells are equal as indicated by zero deflection of the galvanometer. The reference standard is then removed from the sample beam and replaced with the material whose spectral properties are to be determined, and the intensity of the comparison beam is then adjusted until the outputs of the two photocells are again balanced. The ratio of the intensities of the comparison beam when balanced against the unknown and when balanced against the reference standard gives the ratio of the unknown to the standard. This is commonly designated as a null method, and it has the advantage that at balance the reading of the null instrument is independent of fluctuations of intensity in the light source.

The means used for adjusting the intensity of the comparison beam must, of course, be capable of increasing or decreasing the beam intensity by a fixed and known, or measurable, amount. Various devices are commonly used for this purpose, such, for example, as polarizing prisms, calibrated diaphragms, iris diaphragms, sector disks, optical wedges, and the like. All of them have the common characteristic of being non-selective as to wave length of light. This is advantageous because their calibration remains accurate over the range of wave lengths ordinarily used which, in the case of colorimetry is usually the visible spectrum.

Of the devices mentioned, polarizing prisms, e. g., Nicol or Rochon prisms, are probably used most commonly as the light-metering means employed in the comparison beam. One reason for this is that the transmission of a pair of polarizing prisms can be computed exactly because it is a trigonometric function of the angle between the planes of polarization of the prisms, i. e., it is proportional to the square of the cosine ($cos^2$) of that angle. Such prisms cannot be used for all purposes, however, because if they are of small cross sectional area the amount of light transmitted is necessarily small, while their cost increases rapidly as the cross sectional area increases so that prisms large enough for some purpose may be of prohibitive cost.

Polarizing materials are available also in sheet or plate form. One such material sold under the trade-mark "Polaroid" affords a satisfactory means for polarizing light. It is inexpensive as compared with polarizing prisms, and it is available in sheets or plates of large area so that it is possible to provide a polarizing device comprising polarizer and analyzer plates of as large cross sectional area as desired. Accordingly, such a polarizing device would be suitable, other things being equal, for use in spectrophotometry. However, it is characteristic of these materials that above and below certain wave lengths they become less and less efficient as polarizers so that the transmission of crossed plates of Polaroid departs more and more from the $cos^2$ law. For example, the region in which polarization by Polaroid "H" glass is at least 99 per cent efficient is the range from 4,200 to 7,400 Angstrom units. For spectrophotometry it is necessary or desirable that the polarizing efficiency be about 99 per cent or better, and inasmuch as the range from 4000 to 7000 Angstrom units is usually used for colorimetry it will be seen that the polarizing efficiency of this type of Polaroid does not permit satisfactory spectrophotometric measurement adjacent the lower end of the visible spectrum when used in accordance with prior spectrophotometric practice.

Polaroid H and equivalent polarizing devices are characterized by being available in the form of large sheets or plates whose polarizing properties are due to a multitude of microscopically fine crystals of a polarizing substance that are carried per unit of area of the sheet of plate.

An object of this invention is to provide a spectrophotometric method in which use is made of polarizing material in sheet form, such as Polaroid, which permits the use of that material over a wave length range in which it operates efficiently while making the actual measurements over a desired range of the visible spectrum, which is simple and easily practiced, and which is productive of accurate results.

A further object is to provide a spectrophotometric apparatus embodying polarizing material in sheet form, such as Polaroid, as a light-metering means, which affords accurate results while avoiding the disadvantage that such light-metering means is usually efficient over a wave length range different than that customarily used in spectrophotometry within the visible spectrum, which permits measurements to be made over the customary range of the visible spectrum, and which is of simple construction and readily used.

Another object is to provide an apparatus in accordance with the foregoing objects which also minimizes or eliminates the undesirable effect of dark currents upon photocells and similar light-sensitive devices.

Still another object is to provide an apparatus in accordance with the foregoing objects in which differences in spectral sensitivity and in selective absorption in the optical paths are repressed or avoided simply and easily.

Yet another object is to provide a method of and apparatus for spectrophotometry which permit the use of Polaroid and equivalent polarizing material in sheet or plate form for accurate measurement using the customary range of the visible spectrum, and which apparatus comprises means for affecting repression or elimination of the undesirable effects of dark currents upon, differences in spectral sensitivities of, and differences in selective absorption in the optical paths to, the photocells or equivalent light-sensitive devices.

Other objects will appear from the following description.

Figure 1:
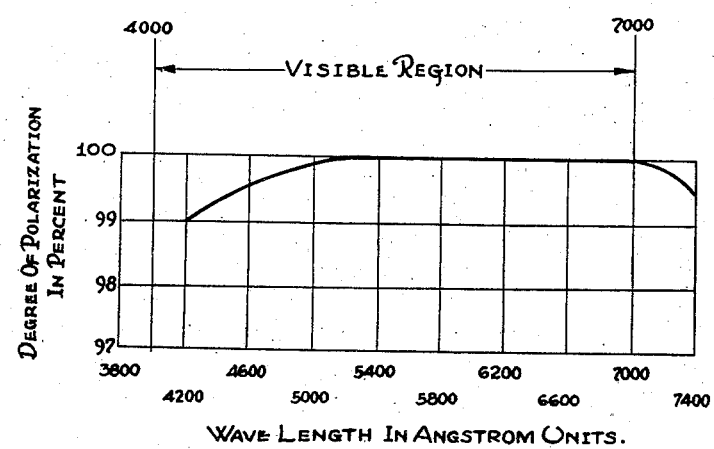

The invention will be described with reference to the accompanying drawings in which Fig. 1 is a graph illustrative of the polarizing efficiency of Polaroid H glass with relation to the range of the spectrum customarily used for spectrophotometry; Fig. 2 a schematic view of an instrument constructed and operated in accordance with the preferred embodiment of the present invention; and Fig. 3 a schematic view of a modification of the instrument shown in Fig. 2 embodying certain refinements.

I have discovered, and it is upon this that the invention is in large part predicated, that polarizing materials in sheet or plate form, and suitably Polaroid materials, may be used satisfactorily for metering of light in spectrophotometry, and the objects of the invention attained, by limiting the wave length of the light supplied to such light-metering means to the range within which it responds to the $\cos^2$ law sufficiently for spectrophotometric purposes, i. e., within which range it produces substantially complete polarization, while subjecting the sample under examination to the range of wave lengths commonly used in spectrophotometry within the visible spectrum, which is customarily from 4000 to 7000 Angstrom units. For the purposes of this invention substantially complete polarization may be taken as about 99 per cent or better.

In accordance with the invention this is accomplished by dispersing polychromatic light to form a visible spectrum in the usual manner. In accordance with practice customary in the art a band of wave lengths, most suitably a beam of relatively restricted wave length range, is then selected from the spectrum by a slit which directs it upon means such as a mirror wedge or a half-silvered mirror for splitting it into two beams, one constituting the sample beam and the other the comparison beam. In accordance with the present invention, in contrast, the comparison beam is formed by a separate slit which is so positioned relative to the slit which forms the sample beam that the two beams are separated by at least the difference between the lowest wave length at which the Polaroid or equivalent polarizing device substantially follows the $\cos^2$ law and the lowest wave length used for the sample beam.

This may be understood by reference to Fig. 1. The lower limit used for the sample beam is at 4,000 Angstrom units, and the lowest wave length at which the type of Polaroid represented causes substantially complete polarization is at 4,200 Angstrom units. Hence according to this invention the slit forming the comparison beam would be so positioned that the lowest wave length selected by it would be at least at 4,200 Angstrom units. In other words, the slits would be positioned so that under all conditions of operation the comparison beam is composed of a band of wave lengths the shortest of which would be at least 200 Angstrom units longer than the shortest wave length of the sample beam.

The difference between the sample and comparison beams should, on the other hand, be no greater than the difference between the highest wave length in which the polaroid device operates efficiently and the highest wave length used for the sample beam. As will be seen from Fig. 1, with Polaroid H the maximum separation of the two beams would therefore be about 400 Angstrom units. Accordingly, with a polarizing device comprising plates of Polaroid H the slits would be adjusted so that the comparison beam would be not less than 200 nor greater than 400 Angstrom units above the sample beam.

For most purposes the distance separating the beams should be as small as possible, within the practice just stated, in order that the two photoelectric devices will be exposed to light of as near the same wave length as possible. That is, when two photocells or similar light-sensitive devices are exposed to exactly the same wave lengths, as where a band selected by a slit is broken into two beams according to conventional practice, and the band of wave lengths passed by the slit is small, then the photoelectric circuit is almost completely independent of fluctuations of intensity of the light source. As the difference between the wave length bands falling on the two photocells increases, the response to fluctuations in intensity of the light source becomes more and more noticeable due to a spectral shift in its output. Nevertheless, if the difference between the bands is kept small, as in the practice just described, this effect will be negligible.

The preferred embodiment of the invention is illustrated schematically in Fig. 2. In the instrument shown light from a suitable source, radiating polychromatic light, such as an incandescent bulb 1, mounted upon an arm 2 mounted to swing about a pivot 3 is passed through a slit 4 formed in a plate 5 likewise carried by arm 2. The band of light passed by slit 4 is dispersed by a prism 6, or other dispersing means, such as a diffraction grating, into the visible spectrum shown schematically as extending between the lines S. The spectrum is projected upon a plate member 7 provided with a pair of slits 8 and 9, and prism 6 is mounted upon a base member 10 connected to arm 2 so that the position of the spectrum can be shifted relative to slits 8 and 9 for scanning of a sample in the manner well understood in the art. Lenses 11 and 11a may be provided, if desired, for their known purposes.

Slit 8 selects from the spectrum S a narrow band of wave lengths which passes as a beam 12 to a sample 13 from which it is reflected as a beam 12a to act upon a photocell 14. Slit 9 selects from the spectrum another narrow band of wave lengths which passes as a beam 15 to a mirror 16 which reflects it as a beam 15a onto another photocell 14a. Mounted in the path of beam 15a is a polarizing device P composed of sheets 17 and 17a of Polaroid or equivalent sheets or plates of polarizing material which act respectively as polarizer and analyzer. The analyzer plate 17a is provided with an index pointer 18 and associated scale 19 for indicating its angular position with respect to the polarizer plate 17.

Photocells 14 and 14a are connected in a conventional photocell circuit. As shown, the anode of photocell 14 is connected by a conductor 20 through batteries 21 and 22 to the cathode of photocell 14a, the anode of the latter being connected by a conductor 23 to the cathode of photocell 14. A null indicating instrument 24, such as a galvanometer or millvoltmeter, is connected in the circuit for indicating attainment of equality of output of the two photocells. Such a circuit may include any of the conventional means for amplifying the current, such as an electronic tube the plate circuit of which includes the null instrument, and one or more grids of which are connected in known fashion to the circuit shown.

The distance between the slits 8 and 9 is such that when the sample 13 is subjected to or scanned over the range of wave lengths over which it is desired to make measurement, the polarizing device will be subjected to a range of wave lengths over which its degree of polarization is sufficiently efficient for the purposes of the invention, say at least 99 per cent. In the case of a polarizer constructed from Polaroid H and where measurements are to be made over the visible region from 4,000 to 7,000 Angstrom units, the distance between slits 8 and 9 will accordingly be at least 200 Angstrom units, and it should not exceed about 400 Angstrom units. The member 7 may be constructed in any suitable manner to permit adjustment of the distance between the slits 8 and 9.

An instrument as thus provided is operated in conventional manner. Thus a reference standard, such as magnesia or magnesium carbonate, acts first as sample 13. The analyzer plate 17a is rotated until the outputs of photocells 14 and 14a are equal, as indicated by zero deflection of the null instrument 24. The reference standard is then replaced by the material which is to be measured and the outputs of the two cells are again balanced. The readings of scale 19 in the two instances afford measurements for computing the ratio of intensity of the beam 12a when reflected from the reference standard and when reflected from the unknown. Of course, the instrument may similarly be used for scanning the whole or any portion of the visible spectrum in known fashion.

Further refinements in the instrument shown are possible for the purpose of extending its accuracy, reliability, and utility. For example, the reliability of a photocell circuit of the type described may be affected, as is known, by dark currents, particularly when the photocells are operated in the dark or at low energy levels, as with dense samples. Under such circumstances the internal resistances of the photocells become very high and minute changes in their dark currents will cause large responses of the null instrument. As disclosed and claimed in my copending application Serial No. 485,393, filed concurrently herewith, this dark current effect can be masked by exposing the photocells during use to auxiliary radiant energy, or illumination, at a level which suffices to prevent the internal resistances of the cells from becoming great enough to be appreciably affected by changes of the dark current. Such auxiliary illumination is most suitably kept low enough not to reduce substantially the circuit sensitivity.

Figure 3:
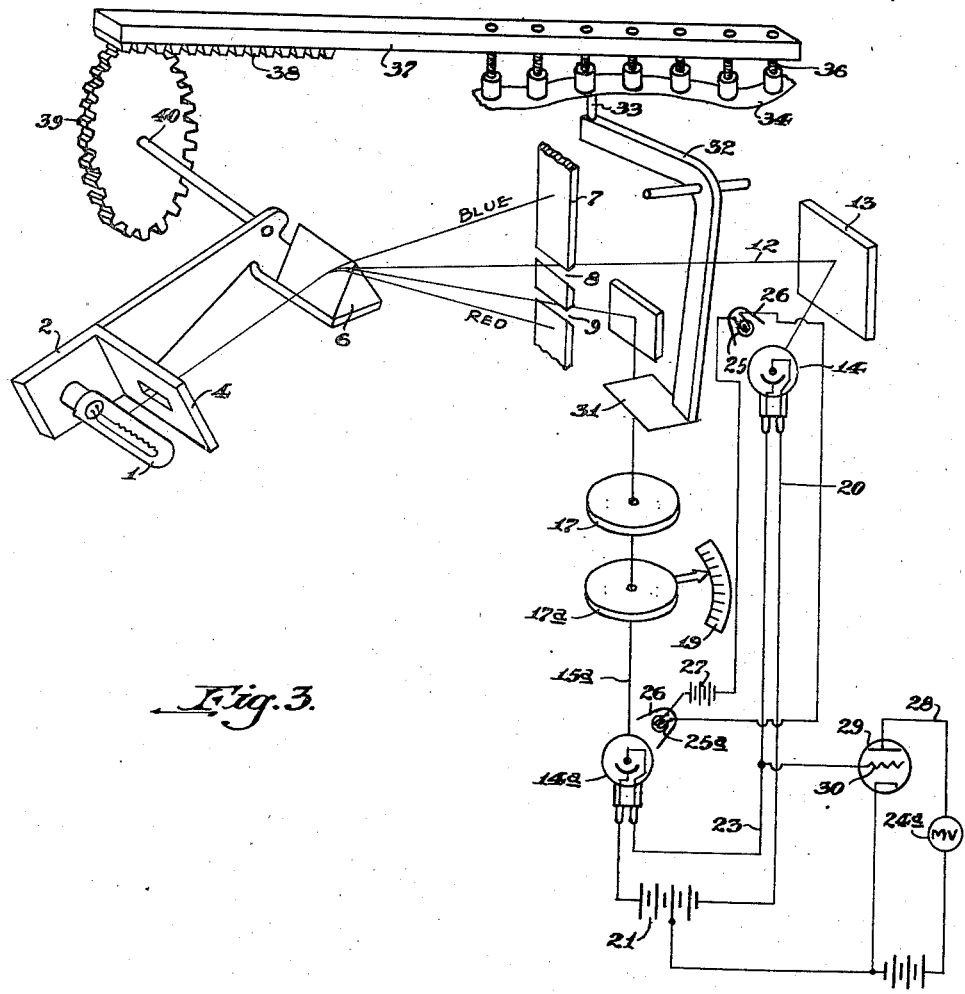

The invention of that application can be used with advantage in the instrument disclosed in this application. One mode of doing this is illustrated in Fig. 3, which shows small flash light bulbs 25 and 25a mounted within shields 26 to illuminate, respectively, photocells 14 and 14a. By operating bulbs 25 and 25a to impinge light of low intensity upon the photocells, the effect of dark currents upon the circuit can be masked out. For most purposes it suffices to operate these auxiliary sources of illumination at the threshold of incandescence, most suitably from a common battery 27. In this embodiment of the invention the galvanometer 24a is shown included in the plate circuit 28 of a three-electrode amplifying tube 29 whose grid 30 is connected to conductor 23.

In the present state of the art it is not possible to construct photocells of matched spectral sensitivity and which will maintain constancy of output with continued use. This factor coupled with differences in selective absorption in the optical paths to the two photocells has made scanning of a sample over the visible spectrum a tedious and time-consuming operation. Thus, it has been necessary to balance the photocells against the reference standard and then against the sample under examination, and to repeat that procedure for each different band of wave lengths used in the scanning process.

In another copending application Serial No. 485,391, filed by me concurrently herewith, now Patent No. 2,336,550, dated December 14, 1943, I have disclosed a method of and means for compensating for the differences in spectral sensitivity of photocells and in selective absorption in their optical paths. Essentially that invention resides in providing a cam having an adjustable surface which is operated in synchronism with the movement of the dispersing member as it is rotated to move the spectrum over the slit. The surface of the cam cooperates with means for adjusting the intensities of one of the beams, preferably the comparison beam, as by actuating a vane to move it into or out of the comparison beam to decrease or increase its intensity. When the instrument is put in use the reference standard is scanned and at each wave length used the surface of the cam is adjusted to actuate the light-interrupting means to balance the outputs of the two photocells. In this way the cam surface is adjusted so that as the prism or other spectrum-forming means is moved to shift the spectrum over the slit, the cam will act to compensate for differences in spectral sensitivities of the cells and in selective absorption in their optical paths for every position of the spectrum. Thereafter an unknown may be scanned continuously, the cam acting automatically in the manner just stated.

Further refinement of the instrument described above is desirable by inclusion of the adjustable cam of my said application Serial No. 485,391, and this may be accomplished, for example, as shown in Fig. 3. A light-interrupting vane 31 is connected to one end of a rocker arm 32 mounted for movement of the vane into or out of beam 15a. The other end of the rocker arm carries a finger 33 which engages with a cam surface provided by a tape, or strip 34, suitably of metal. The tape is slidably mounted in yokes formed in the lower ends of a plurality of equally spaced members 36 carried by screws mounted in a rod 37. By turning the screw members in an appropriate direction members 36 may be raised or lowered and thus the contour of the cam surface can be adjusted to effect the desired result, as described above. At its opposite end rod 37 is provided with a rack 38 which is engaged by a pinion 39 which is keyed to a shaft 40 connected to the pivot point of arm 2. As the arm is swung to move the spectrum relative to slits 8 and 9, the rod 37 will accordingly be moved forwardly or backwardly, as the case may be, to move vane 31 into or out of beam 15a. With the cam surface properly adjusted against a reference standard, a sample 13 can then be scanned continuously.

For many purposes it is preferable to construct the instruments in accordance with the representation of Fig. 3, to combine the functions and benefits of the instrument shown in Fig. 2 with those of the inventions of my aforesaid applications Serial Nos. 485,391 and 485,393.

Various modifications of the embodiments shown are, of course, permissible, as will be recognized by those familiar with spectrophotometry. For example, prism 6 may be replaced by a diffraction grating, or instead of the light-interrupting vane 31 there may be used electrical controls actuated by cam strip 34. Likewise, the simple amplifier shown in Fig. 3 may be replaced by various other known amplifier circuits, or the null indicating instrument 24a may be replaced or supplemented by a recording instrument.

According to the provisions of the patent statutes, I have explained the principle, preferred embodiment and mode of operation of my invention and have illustrated and described what I now consider to represent its best embodiment. However, I desire to have it understood that, within the scope of the appended claims, the invention may be practiced otherwise than as specifically illustrated and described.

I claim:

1. In a spectrophotometric method, the combination of steps comprising passing a narrow wave length band of light as a sample beam to a sample and thence to a light-sensitive device the output of which is a flow of current related to light impinged on said device, passing another narrow wave length band of light as a comparison beam through a light-varying means comprising a polarizer and an analyzer formed of sheet material which does not effect complete polarization throughout the visible spectrum to a second light-sensitive device, and by adjustment of said light-varying means to regulate the proportion of said comparison beam passed by it balancing the outputs of said devices, said comparison and sample beams being separated spectrally between adjacent edges of said bands by at least the difference between the shortest wave length at which said polarizing material produces substantially complete polarization and the shortest wave length used for the sample beam during scanning of the sample, and said separation being not substantially greater than the difference between the longest wave length at which said material produces substantially complete polarization and the longest wave length used for said sample beam, and scanning said sample over at least that portion of the spectrum over which said light polarizing material does not effect complete polarization while maintaining said separation between the sample and comparison beams and while maintaining the comparison beam within the portion of the spectrum in which polarization is substantially complete.

2. In a spectrophotometric method, the combination of steps comprising dispersing polychromatic light to form a spectrum, passing a narrow band of said spectrum as a sample beam to a sample and thence to a light-sensitive device the output of which is a current varying according to light impinged on it, passing another narrow band of said spectrum as a comparison beam through a light-varying means comprising a polarizer and an analyzer formed of sheet material carrying a multitude of microscopic polarizing crystals and which material does not effect complete polarization throughout the visible spectrum, to a second light-sensitive device, and by adjustment of said light-varying means to regulate the proportion of said comparison beam passed by it balancing the outputs of said devices, said comparison and sample beams being separated spectrally between adjacent edges of said bands by at least the difference between the shortest wave length at which said polarizing material produces substantially complete polarization and the shortest wave length used for the sample beam during scanning of the sample, and said separation being not substantially greater than the difference between the longest wave length at which said material produces substantially complete polarization and the longest wave length used for said sample beam, and scanning said sample over at least that portion of the spectrum over which said light-polarizing material does not effect complete polarization while maintaining said separation between the sample and comparison beams and while maintaining the comparison beam within the portion of the spectrum in which polarization is substantially complete.

3. A spectrophotometer method according to claim 2 in which said light-sensitive devices are photocells.

4. A spectrophotometer comprising the combination of a pair of parallel slits disposed in a common plane, means for forming a visible spectrum in the plane of and transverse to said slits and for moving the spectrum transversely of them, a light-sensitive device which provides a flow of current in response to light fluctuations disposed to receive a sample beam of light passed by one of said slits, and a second light-sensitive device disposed to receive a comparison beam of light from the other of said slits, light-varying means disposed in the path of said comparison beam and comprising a polarizer and an analyzer formed of sheet material which does not effect complete polarization throughout the visible spectrum, and said polarizer and analyzer being relatively adjustable to vary the light transmission, and an electric circuit including said light-sensitive devices and means responsive to current flowing in the circuit for indicating equality of output of said light-sensitive devices, said slits being separated by at least the distance between the shortest wave length at which said polarizing material produces substantially complete polarization and the shortest wave length of the sample beam usable during scanning of the sample but said separation being not substantially greater than the difference between the longest wave length at which said material produces substantially complete polarization and the longest wave length useable for said sample beam.

5. A spectrophotometer according to claim 4, said sheet material carrying a multitude of microscopic polarizing crystals.

6. A spectrophotometer according to claim 4, said light-sensitive devices being photocells, and said sheet material carrying a multitude of microscopic polarizing crystals.

7. A spectrophotometer comprising the combination of a source of polychromatic light, a pair of parallel slits disposed in a common focal plane, means for dispersing light from said source to form a visible spectrum in the plane of and transverse to said slits and for moving the spectrum transversely of them, a photocell disposed to receive a sample beam of light passed by one slit, a second photocell disposed to receive a comparison beam of light from the other slit, light-varying means disposed in the path of said comparison beam and comprising a polarizer and an analyzer formed of sheet material carrying a multitude of microscopic polarizing crystals and relatively adjustable to vary the light transmission, which material does not effect complete polarization throughout the visible spectrum, and an electric circuit including said photocells and means responsive to current flowing in the circuit for indicating attainment of equality of output of said photocells, said slits being separated by at least the distance between the shortest wave length at which said polarizing material produces substantially complete polarization and the shortest wave length of the sample beam useable during scanning of the sample but being separated by a distance not substantially greater than the distance between the longest wave length at which the polarizing material produces substantially complete polarization and the longest wave length of said sample beam.

8. A spectrophotometer comprising a pair of slits disposed in a common focal plane, means for forming a visible spectrum in the plane of and transverse to said slits, means for moving the spectrum transversely of the slits, an electric circuit including a pair of light-sensitive devices which provide a flow of current in response to light fluctuations, a source of electric current connected to said light-sensitive devices in said circuit, and means associated with said circuit responsive to current flowing therein for indicating attainment of equality of output of said light-sensitive devices, one of said devices being arranged to receive from a sample a beam of light passed to it through one slit, the other of said light-sensitive devices being arranged to receive another beam of light from the other slit, light-varying means disposed in the path of said other beam comprising a polarizer and an analyzer of sheet material carrying a multitude of microscopic polarizing crystals and relatively adjustable to vary the light transmission, which material does not effect complete polarization throughout the visible spectrum, light-interrupting means in the path of one of said beams, an adjustable-surface cam operatively associated with said light-interrupting means and with said spectrum moving means for actuating the light-interrupting means to regulate the intensity of said beam to balance the outputs of said devices over the entire spectrum, said slits being separated by at least the distance between the shortest wave length at which said polarizing material produces substantially complete polarization and the shortest wave length of the sample beam useable during scanning of the sample but being separated by a distance not substantially greater than the distance between the longest wave length at which the polarizing material produces substantially complete polarization and the longest wave length of the sample beam.

9. A spectrophotometer comprising a source of polychromatic light, a pair of slits disposed in a common focal plane, means for dispersing light from said source to form a visible spectrum in the plane of and transversely to said slits, means for moving the spectrum transversely of said slits, an electric circuit including a pair of photocells a source of electric current connecting said photocells in said circuit, and means associated with said circuit responsive to current flowing therein for indicating attainment of equality of output of said photocells, one of said photocells being arranged to receive from a sample a beam of light passed to it through one slit, the other of said photocells being arranged to receive another beam of light from the other slit, light-varying means disposed in the path of said another beam comprising a polarizer and an analyzer of sheet material carrying a multitude of microscopic polarizing crystals and relatively adjustable to vary the light transmission, which material does not effect complete polarization throughout the visible spectrum, light-interrupting means acting in the path of said another beam, an adjustable-surface cam operatively associated with said light-interrupting means and with said spectrum moving means for actuating the light-interrupting means to regulate the intensity of said beam to balance the outputs of said photocells, said slits being separated by at least the distance between the shortest wave length at which said polarizing material produces substantially complete polarization and the shortest wave length of the sample beam useable during scanning of the sample but being separated by a distance not substantially greater than the distance between the longest wave length at which the polarizing material produces substantially complete polarization and the longest wave length of the sample beam.

10. A spectrophotometer comprising a pair of slits disposed in a common focal plane, means for forming a visible spectrum in the plane of and transverse to said slits, means for moving the spectrum transversely of said slits, an electric circuit including a pair of photocells, a source of electric current connecting said photocells in said circuit, and means associated with said circuit responsive to current flowing therein for indicating attainment of equality of output of said photocells, one of said photocells being arranged to receive from a sample a beam of light passed to it through one slit, the other of said photocells being arranged to receive another beam of light from the other slit, a light-varying means disposed in the path of said another beam comprising a polarizer and an analyzer of sheet material carrying a multitude of microscopic polarizing crystals and relatively adjustable to vary the light transmission, which material does not effect complete polarization throughout the visible spectrum, and an auxiliary source of illumination associated with each of said photocells for exposing them to illumination at a low level sufficient to mask dark current effects, said slits being separated by at least the distance between the shortest wave length at which said polarizing material produces substantially complete polarization and the shortest wave length of the sample beam useable but being separated by a distance not substantially greater than the distance between the longest wave length at which the polarizing material produces substantially complete polarization and the longest wave length of the sample beam.

11. A spectrophotometer comprising a pair of slits disposed in a common focal plane, means for forming a visible spectrum in the plane of and transverse to said slits, means for moving the spectrum transversely of said slits, an electric circuit including a pair of light-sensitive devices which provide a flow of current in response to light fluctuations, a source of current connecting said light-sensitive devices in said circuit, and means associated with said circuit responsive to current flowing therein for indicating attainment of equality of output of said light-sensitive devices, one of said devices being arranged to receive from a sample a beam of light passed to it through one slit, the other of said devices being arranged to receive another beam of light from the other slit, light-varying means disposed in the path of said another beam comprising a polarizer and an analyzer of sheet material carrying a multitude of microscopic polarizing crystals and relatively adjustable to vary the light transmission, which material does not effect complete polarization throughout the visible spectrum, light-interrupting means in the path of one of said beams, an adjustable-surface cam operatively associated with said light-interrupting means and with said spectrum moving means for actuating said light-interrupting means to regulate the intensity of said beam to balance the outputs of said devices over the spectrum, and an auxiliary source of illumination associated with said light-sensitive devices for exposing them to illumination at a low level sufficient to mask dark current effects, said slits being separated by at least the distance between the shortest wave length at which said polarizing material produces substantially complete polarization and the shortest wave length of the sample beam useable but being separated by a distance not substantially greater than the distance between the longest wave length at which the polarizing material produces substantially complete polarization and the longest wave length of the sample beam.

12. A spectrophotometer according to claim 11 comprising a source of polychromatic light associated with said spectrum forming means, said light-sensitive devices being photocells, and said light-interrupting means being in the path of said another beam.

13. A spectrophotometer comprising the combination of means for forming a visible spectrum in a plane, means disposed in the plane of said spectrum for selecting from it a pair of beams of light, means for moving said spectrum across said beam-selecting means, a photocell disposed to receive one of said pair of beams as a sample beam, a second photocell disposed to receive the other of said pair of beams as a comparison beam, light-varying means disposed in the path of said comparison beam comprising a polarizer and an analyzer of sheet material carrying a multitude of microscopic polarizing crystals and relatively adjustable to vary the light transmission, which material does not effect complete polarization throughout the visible spectrum, and an electric circuit including said photocells, means associated with said circuit responsive to current flowing therein for indicating attainment of equality of output of said photocells, said beams being separated spectrally by said selecting means during scanning of the sample by at least the distance between the shortest wave length at which said polarizing material produces substantially complete polarization and the shortest wave length of the sample beam useable but being separated by a distance not substantially greater than the distance between the longest wave length at which the polarizing material produces substantially complete polarization and the longest wave length of the sample beam.

ANDREW P. KRUPER.